United States Patent

[11] 3,607,354

| | | | |
|---|---|---|---|
| [72] | Inventors | Lester C. Krogh<br>Roseville Township;<br>Richard E. Brink, White Bear Township,<br>both of Ramsey County, Minn. | |
| [21] | Appl. No. | 870,616 | |
| [22] | Filed | Nov. 14, 1969 | |
| [45] | Patented | Sept. 21, 1971 | |
| [73] | Assignee | Minnesota Mining and Manufacturing<br>Company<br>St. Paul, Minn.<br>Continuation of application Ser. No.<br>552,684, Nov. 7, 1955, now abandoned. | |

[54] METHOD OF DELUSTERING POLYETHYLENE TEREPHTHALATE FILM
6 Claims, No Drawings

[52] U.S. Cl. ............................................... 117/47 R,
117/63, 117/138.8 F, 156/2
[51] Int. Cl. .............................................. B44d 1/092
[50] Field of Search ........................................... 51/297,
298; 117/47 A, 63, 138.8 F, 47, 47 R, 138.8 A,
138.8 B, 138.8 C, 11; 18/56, 57; 154/2, 52 BW,
123, 139, 140, 121, 136

[56] References Cited
UNITED STATES PATENTS

| | | | |
|---|---|---|---|
| Re. 16,535 | 1/1927 | Joseph........................... | 154/52 BW |
| 2,111,272 | 3/1938 | Paulson......................... | 51/298.1 |
| 2,165,955 | 7/1939 | Haarhoff........................ | 154/123 |
| 2,219,853 | 10/1940 | Tone............................. | 154/123 |
| 2,236,597 | 3/1941 | Hatch............................ | 51/298.1 |
| 2,317,650 | 4/1943 | Stratford....................... | 51/298.1 |
| 2,339,500 | 1/1944 | Martin........................... | 154/123 |
| 2,357,350 | 9/1944 | Oakes............................ | 51/298 |
| 2,444,830 | 7/1948 | Kellgren et al................. | 134/136 |
| 2,567,186 | 9/1951 | Cross et al. ................... | 154/95 |
| 2,598,090 | 5/1952 | Yung............................. | 154/121 |
| 2,641,592 | 6/1953 | Hofrickter..................... | 154/139 |
| 2,650,213 | 8/1953 | Hofrickter..................... | 154/139 |
| 2,673,826 | 3/1954 | Ness............................. | 117/138.8 R |
| 2,711,365 | 6/1955 | Price et al..................... | 51/298 |
| 2,712,987 | 7/1955 | Storrs........................... | 51/298 |
| 2,745,224 | 5/1956 | Erickson ....................... | 51/297 |
| 2,774,679 | 12/1956 | Remer........................... | 117/11 |
| 2,779,668 | 1/1957 | Daniels.......................... | 51/298 |
| 2,785,085 | 3/1957 | Sayre............................ | 117/138.8 R |
| 2,790,727 | 3/1957 | Hilborn ........................ | 117/138.8 R |
| 2,848,350 | 8/1958 | Yaeger.......................... | 117/47 R |
| 2,893,896 | 7/1959 | Beeber ......................... | 117/118 |

*Primary Examiner*—Murray Katz
*Attorney*—Kinney, Alexander, Sell, Steldt & Delahunt

ABSTRACT: The normally lustrous surface of a polyethylene terephthalate film is delustered and made capable of forming a strong adherent bond with adhesive compositions. The film is treated with a coating of a hydroxybenzene derivative solvent primer material.

METHOD OF DELUSTERING POLYETHYLENE TEREPHTHALATE FILM

This application is a continuation of application Ser. No. 552,684, filed Nov. 7, 1955, now abandoned.

This invention relates to abrasive-coated flexible films and to methods of making the same. More specifically, the invention relates to rugged, firmly bonded, abrasive-coated film products having an exceedingly strong and tough water-, oil-, solvent- and heat-resistant, thin, continuous film base, and particularly a biaxially oriented thin linear polyester film base, and to methods of providing on such base the required firmly adherently bonded coating of abrasive grit particles.

One commercially available polyester film which is found to be particularly useful in the practice of this invention is a high molecular weight polyethylene terephthalate linear polyester film which has been rapidly cold drawn, "tensilized" or "oriented" in both lengthwise and crosswise directions. Biaxially oriented "Mylar" polyester film is a specific example. Such film is extremely strong and tough, is not softened by water or oil, is not affected by the usual organic solvents, and retains its strength and flexibility over a wide range of temperatures, e.g., from +30° C. to +150° C. It is sufficiently hard to resist penetration and deformation under severe pressures. The film is transparent and has a hard, smooth, lustrous surface to which most adhesives adhere only poorly, if at all. It has a low coefficient of friction against many surfaces. The material is available in continuous flexible thin films of excellent uniformity.

The resistance of such polyester films to adhesive bonding is well known. Furthermore the film is slippery to the touch, particularly in the presence of liquids. Presumably as a result of these and other properties of the material, no one, at least prior to the present invention, ever successfully attempted to produce an abrasive-coated sheet product having a tough, dimensionally stable, hard, flexible, solvent-resistant backing member of the nature of an oriented thin film of polyethylene terephthalate.

As an illustration of the difficulties involved, it is well known that water soluble adhesives are substantially completely nonadherent to polyethylene terephthalate films. It has also been found that typical thermosetting alkyd resin binders and thermosetting phenol-aldehyde resin binders conventionally employed for bonding abrasive grit to various backing materials are substantially nonadherent to such polyester surfaces. Certain catalyzed epoxy resin binders have shown moderate adhesion to the polyester film when applied in a single thin layer; but the application of a second layer of the same resin, followed by conventional curing procedures, has in such cases greatly reduced the effectiveness of even this moderate bond. A number of other abrasive binder compositions have shown similar results when applied in multiple layers. Since the use of multiple layers, e.g., abrasive binder and sandsize coatings, is ordinarily essential to the effective bonding and reinforcing of the abrasive grit particles, these adhesive compositions have proven entirely ineffective in prior attempts to employ them in the manufacture of coated abrasive sheet material having a polyethylene terephthalate or equivalent film backing.

Accordingly, a specific object of this invention is the provision of a flexible coated sheet product in which a surface adhesive layer is firmly adherently bonded to a highly oriented thin film of a linear high molecular weight polyester polymer such as polyethylene terephthalate. A further object is the provision of means for forming a firm adherent bond to the surface of such oriented film. Another object is the provision of a flexible abrasive-coated sheet product in which the abrasive grain is firmly adherently bonded to a strong, tough, water-, oil-, solvent- and heat-resistant thin continuous film backing. Ancillary objects include the provision of means for attacking the lustrous surface of oriented polyethylene terephthalate and similar films to provide for firm adherent bonding thereto as well as for other purposes; the provision of means for firmly bonding together adjoining areas of the film, as in forming continuous belts or laminated articles; and the provision of means for improving the handling characteristics of the coated film products. A particular object is the provision of means for firmly adherently bonding particulate abrasive material to oriented polyethylene terephthalate or similar film, more especially with a plurality of layers of resinous binder sufficient to support the abrasive grains against the severe stresses inherent in abrasive grinding action. Other objects and advantages will be made apparent as the description proceeds.

It has now been found that the normally lustrous surface of oriented thin films of polyethylene terephthalate and equivalent polymers may be delusterized and rendered capable of accepting various adhesive compositions to provide firm adherent bonds as required in coated abrasive structures, by a process involving pretreatment of the surface with extremely thin coatings of ortho-chlorophenol or equivalent solvent priming materials, all as will now be further described in connection with illustrative but nonlimitative specific examples.

A preferred embodiment of the invention is illustrated in cross section in the accompanying drawing, showing a normally lustrous, thin and strong polyester film which has been delustered on one surface and them provided with a firmly adherently bonded binder layer and an associated abrasive grit layer.

EXAMPLE 1

An oriented film of polyethylene terephthalate polymer having a thickness of 1.5 mils and a tensile strength of 25.5 lbs. per in. of width was coated with a thin film of a 30 percent solution in xylene of ortho-chlorophenol containing 1 percent on the weight of the chlorinated phenol of a fluorescent dye (Calco Fluoro White RW). The thickness of the coating was determined photoelectrically and was found to be approximately 460 angstrom units. Application of the coating changed the lustrous surface of the film to a nonlustrous, translucent appearance, and the tensile strength of the film was reduced to about 24.4 lbs. per in. of width.

The treated surface of the film was next coated, to the extent of slightly more than 5 grains per 24 sq. in., with an abrasive binder consisting of the reaction product of 110 parts of castor oil and 45 parts of toluene 2,4-diisocyanate, the adhesive being applied in liquid form as an 85 percent solution in xylene. An excess of grit 320 silicon carbide abrasive particles was then applied and the unbonded portion removed by shaking, leaving a coating weight of 17 grains of the abrasive per 24 sq. in. The sheet was heated at 180° F. and 100 percent relative humidity for 1½ hours to cure the resinous binder. A sandsize coating of 8 grains per 24 sq. in. of a 55 percent solution, in a mixture of equal parts of water and ethylene glycol monoethyl ether, of an "A" stage phenol-aldehyde resin was applied over the abrasive layer, and the sheet was again heated for 24 hours at 185° F.

The back surface of the sheet material was next coated with a slurry of very fine cork flour in a dilute solution in toluol of an adhesive cement composition comprising a mixture of approximately equal parts by weight of polychloroprene and a normally solid compatible phenol-aldehyde resin, and the sheet was dried at moderately elevated temperature. The flexible rubbery coating was not more than 1 mil (0.001 inch) in thickness, and was sufficiently adherent to the film to be retained during hand-sanding operations.

The resulting abrasive sheet was evaluated in comparison with a sheet of highest quality conventional waterproof sandpaper of the same grit size but prepared with a treated paper backing, by methods involving hand sanding of a lacquered steel panel.

The sheets were first soaked in water at 80° F. The flexibility of the product of this example was initially adequate and remained unchanged even on prolonged soaking. The treated paper sheet was initially somewhat stiff and required soaking and flexibilizing for most effective sanding. Prolonged soaking extensively softened and weakened the treated paper backing.

The product of this example was noticeably faster in abrading and polishing the coated panel than was the conventional paper backed material. There was no loss of mineral by flaking or by other breakdown of the adhesive bond to the film surface. The coating on the reverse side of the film provided a secure grip for the operator and permitted easy handling of the sheet in the presence of water and soap solutions employed during the abrading operation.

The particular abrasive binder employed in this example is itself capable of forming relatively strong bonds with the untreated lustrous surface of oriented polyethylene terephthalate films. However the priming step employed in the example provides additional assurance against removal of the abrasive coating, particularly under application of secondary adhesive coatings and in the presence of aqueous or other solutions employed during the abrading operation.

EXAMPLE 2

A 5 mil film of oriented polyethylene terephthalate polymer was coated with a melt of para-chlorophenol containing a fluorescent dye, applied with squeeze rolls, to produce a final coating thickness of 1160 angstrom units, as determined by photoelectrical analysis as in Example 1. To the delustered surface was then applied 15 grains per 24 sq. in. of an abrasive binder composition consisting of 100 parts of liquid epoxy resin Bakelite BR-18774), 14 parts of amine catalyst (metaphenylenediamine) and sufficient ethylene glycol monoethyl ether to provide a viscosity of 280 centipoises. Grit 80 aluminum oxide abrasive grain was electrostatically transferred to the adhesive-coated surface to a weight of 75 grains per 24 sq. in. The sheet was heated for 1 hour at 150° F. and 1-½ hours at 185° F. The abrasive-coated surface was then sandsized with 54 grains per 24 sq. in. of a 67 percent solution of the "A" stage phenol-aldehyde resin of example 1, the solvent was removed by evaporation and the sheet was cured by heating for 4 hours at 212° F. followed by 6 hours at 250° F.

When the abrasive-coated surface of the sheet was bonded to a test surface with a thermosetting heat-activated film of a blend of polyvinylbutyral and phenol-aldehyde resin, and an extended end of the sheet was then pulled back over the exposed surface of the adhered portion as a means of testing the adhesion of the abrasive layer to the polyester film, it was found that no delamination occurred until the force applied was sufficient to cause failure of the film itself. A control structure made with the same film, abrasive bond, abrasive grain, and sandsize but without the intermediate solvent priming application was found to have substantially no adhesive bond between the film and the abrasive layer.

Abrasion and mineral loss tests made against various surfaces in comparison with highest quality conventional types of coated abrasive sheet material of the same abrasive grit size invariably resulted in increased rate of cut, or reduced sand loss and increased life, for the product of this example.

A strip of the coated sheet material of this example was converted into a coated abrasive belt by first removing the abrasive layer at one end of the strip, applying a thin coating of para-chlorophenol to the thus exposed surface of the film backing and to an equivalent area of the back surface of the other end of the strip, and then pressing the two coated areas together under a pressure of 800 lbs. per sq. in. at a platen temperature of 270° F. for approximately 20 seconds. The belt showed substantially greater cutting ability against a steel test piece than did a conventional abrasive belt of the same grit size and weight but made on a resin-treated waterproofed cloth backing.

EXAMPLE 3

A 5 mil film of oriented polyethylene terephthalate was surface treated with a thin (1,200 angstrom) coating of para-chlorophenol and was coated with 15 grains per 24 sq. in. of the epoxide resin abrasive binder of example 2. A total of 74 grains per 24 sq. in. of grit 80 silicon carbide abrasive particles was then electrostatically transferred to the adhesive layer, and the sheet was heated for 1 hour at 150° F. and 1½ hours at 185° F. It was next sandsized with sufficient of a 55 percent solution of an "A" stage phenol-aldehyde resin to fill the voids between the particles and to provide a well-filled appearance on the surface, which in this case required a coating weight of about 50 grains of the solution per 24 sq. in. It was then cured by heating for 4 hours at 212° F. and for 6 hours at 250° F. The resulting sheet was stiff and substantially inflexible, and was therefore flexed so that it could be successfully used as abrasive belt stock. Flexing was accomplished by drawing the sheet material over a soft rubber roller, with the abrasive layer in contact with the roller, while forcing a narrow steel bar against the back surface of the sheet, thereby sharply curving the sheet and forcing the curved area into the soft rubber of the roller. After this treatment, the sheet material could be readily flexed and bent back upon itself in all directions. The abrasive coating was found to be broken up into small separate islands, each of which was firmly adherently bonded to the polyester base. No appreciable loss of abrasive layer could be observed during this flexing process.

The flexed sheet was cut into strips and formed into continuous abrasive belts by lightly coating the back film surface areas at the two ends of a strip with ortho-chlorophenol, butting the two ends together, and forcing them against a similarly coated section of 5-mil oriented polyester film under heat and pressure. The total thickness of the completed splice area was about 1 mil thicker than unspliced areas of the belt. These belts were evaluated in a glass-sanding operation. The driven belt was supported from the back side over the grinding area on a flat steel platen, and a glass test piece was pressed against the belt at the supported area while a stream of water was applied to the belt just ahead of the point of contact. Prolonged continuous sanding demonstrated substantial improvement in abrading ability over analogous conventional waterproof abrasive belt products employing treated fibrous backing. Where the conventional belt stretched approximately 1.5 percent of its initial length, the belt of this example was found to stretch not more than about 0.2 percent during the above described wet sanding operation. There was no indication of loss of abrasive layer by delamination at the surface of the polyester film.

It is of interest to note that the improved results obtained with the abrasive belt of this example are based on a backing member which is only 5 mils in thickness, whereas abrasive belts of the prior art, based on treated fibrous backings having sufficient strength and ruggedness to withstand the severe stresses involved in the wet sanding of glass have been at least about 15 mils in thickness.

EXAMPLE 4

A thin layer of tetrachloroethane was applied to the surface of a 5 mil film of biaxially oriented polyethylene terephthalate and the film was placed in a 300° F. oven for 3 minutes. The resulting delustered film was then provided with an adherently bonded abrasive layer as described under example 2. When this abrasive-coated product was adhered to a test surface and measured for delamination resistance by the procedure described under example 2, it was found that delamination occurred under somewhat lower stress than was the case in that example. However the product was fully effective under all hand-sanding operations and under many of the less drastic machine sanding operations.

In the absence of the tetrachloroethane treatment, the abrasive binder did not provide an effective bond with the polyester film.

EXAMPLE 5

A 5 mil film of biaxially oriented polyethylene terephthalate was primed with ortho-chlorophenol as in example 1. The sheet was coated with 20 grains per 24 sq. in. of an abrasive binder composition consisting of a 75 percent solution of an "A" stage phenol-aldehyde resin; 75 grains per 24 sq. in. of grit 80 aluminum oxide abrasive grain was uniformly deposited under the surface of the adhesive; 54 grains per 24 sq. in. of a sandsize composition consisting of a 67 percent solution of "A" stage phenol-aldehyde resin was applied; and the sheet was cured by heating for 4 hours at 212° F. followed by 6 hours at 250° F. As in example 4, the bond obtained between the abrasive layer and the polyester film backing was somewhat lower than that obtained in the structure of example 2, but was fully adequate for many sanding operations. In the absence of the priming treatment, the phenolic abrasive binder provided substantially no adhesive bonding to the surface of the polyester film.

Oriented high molecular weight polyethylene terephthalate polyester film has been specified in each of the above examples, and is a preferred example of a strong and tough, water-, oil-, solvent-, thin, continuous film backing suitable for the purposes of this invention, although equivalent modifications of such polyalkylene phthalate linear polyesters are also contemplated. For example, polypropylene terephthalate film or a film of a polyester of ethylene glycol with a major proportion of terephthalic acid and a minor proportion of isophthalic or other equivalent dicarboxylic acid are also useful. These films are necessarily highly oriented, preferably in both lengthwise and crosswise direction, in order to attain the desired high strength, resistance to stretch, and other properties. However, nonoriented films may be similarly treated; and it is also contemplated to employ films which are oriented in but a single direction, and then to combine two or more such films, to provide equally strong and substantially thicker backing sheet materials. Multiple layers of biaxially oriented film may similarly be laminated to provide sheets of a thickness which it would be extremely difficult to achieve by direct orientation of a single layer. Combination of the several layers is effected by precoating with a solvent primer material the two surfaces which are to be combined, and then pressing said surfaces together at an elevated temperature, substantially as described in connection with the formation of a belt splice under example 2. In this manner two discs of abrasive coated film are combined to form a double coated cutoff wheel structure. For greater strength and increased thickness, an uncoated disc of the polyester film is incorporated between the two abrasive coated discs.

It has been pointed out that extremely thin films or coating of the solvent primer material are fully effective, both in changing the appearance of the initially lustrous surface of the polyester film and in providing a surface to which various abrasive binder materials may form a firmly adherent bond. It has also been pointed out that, even with these small amounts of solvent primer, tensile strength of thin films may be observably reduced. While substantially larger amounts of the solvent primer material may be applied, e.g., as may be noted by comparing example 1 and 2, it is preferred to employ only a minimum amount consistent with forming a continuous coating over the surface to be treated. Obviously, larger amounts of the solvent primer have less proportional effect on thicker films than on the very thin film of example 1.

Both solid and liquid solvent primer materials may be employed, as indicated in specific examples. In most cases, solvent priming is accomplished on mere contact of the solvent primer material with the surface of the polyester film. In other cases, heating of the coated film to moderate or relatively high temperatures may be necessary. In any event, the delustering effect produced at the initially lustrous surface of the film provides an effective means of determining when the solvent priming has been achieved.

Many solvent priming materials are known in addition to those disclosed in the above specific examples. These include: meta-chlorophenol, parabromophenol, trichloroacetic acid, trifluoroacetic acid, resorcinol, diethylene triamine, phenol, para-toluene sulfonic acid, catechol, ortho cresol, meta cresol, para cresol, aniline, 2,4-dichloro-phenol, ortho-phenyl phenol, pyrogallic acid, and salicylic acid. Moderate heating may be used to accelerate the action where desired.

Some degree of priming action, which is effective for some of the less drastic applications, may be obtained with monochloroacetic acid, ortho-hydroxybenzyl alcohol, ortho-nitrophenol, triethanolamine, diethyl ethanolamine, succinic anhydride, para-phenyl phenol, nitrobenzene, furfural, para-dichlorobenzene, quinoline, para-tertiary butyl-phenol, benzyl alcohol, and benzaldehyde by coating the same on the polyester film and heating to still higher temperature.

Of the solvent primers listed, the hydroxybenzene derivatives and the trihaloacetic acids have been found to dissolve oriented polyethylene terephthalate polymer most rapidly, and are greatly preferred for the purposes of this invention.

Improved bonding to the surface of oriented polyethylene terephthalate films by means of the principles of this invention has been demonstrated with such widely dissimilar binder material as epoxy resins, diisocyanate adhesives, phenol-aldehyde resins, short oil varnish alkyds, urea-aldehyde resins, resinous polyesters, and animal glue. With most if not all of these adhesive material substantially no bond is obtained to the polyester film in the absence of the priming step. With the primed film, on the contrary, a usefully high degree of bond is obtained, and the bond is retained even on the application of successive coatings of the same or other adhesive material.

We claim:

1. The method of delustering the normally lustrous surface of a thin flexible oriented polyethylene terephthalate structure which comprises applying to said lustrous surface a continuous coating of a hydroxybenzene derivative solvent primer material so as to cause delustering of said surface without substantially decreasing the tensile strength of said product, said hydroxybenzene derivative consisting essentially of a compound selected from the group consisting essentially of ortho-chlorophenol, meta-chlorophenol, para-chlorophenol, parabromonphenol, resorcinol, phenol, catechol, ortho cresol, meta cresol, para cresol and 2,4 dichlorophenol, the delustered surface of said structure being capable of accepting and forming strong adherent bonds with adhesive compositions which are not so accepted by a lustrous surface of said structure.

2. The method of claim 1 wherein the hydroxybenzene derivative is a chlorinated phenol.

3. The method of claim 2 wherein the chlorinated phenol is ortho-chlorophenol.

4. The method of claim 2 wherein the chlorinated phenol is para-chlorophenol.

5. The method of making a coated sheet material having a layer of particulate matter firmly adherently bonded to a surface of an oriented polyalkylene terephthalate film which includes the steps of delustering the normally lustrous surface of said film with a hydroxybenzene derivative solvent primer material, said hydroxybenzene derivative consisting essentially of a compound selected from the group consisting essentially of ortho-chlorophenol, meta-chlorophenol, para-chlorophenol, parabromophenol, resorcinol, phenol, catechol, ortho cresol, meta cresol, para cresol and 2,4 dichlorophenol, applying to the delustered surface a layer of solid particles dispersed in a liquid binder, and then hardening the binder to a solid state.

6. The method of claim 5 wherein the solid particles are abrasive granules.